United States Patent
Kiwus et al.

(10) Patent No.: US 10,350,975 B2
(45) Date of Patent: Jul. 16, 2019

(54) VEHICLE COMPONENT

(71) Applicant: Dr. Ing. h.c. F. Porsche Aktiengesellschaft, Stuttgart (DE)

(72) Inventors: David Kiwus, Stuttgart (DE); Reimund Schlachter, Muehlacker (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 15/634,047

(22) Filed: Jun. 27, 2017

(65) Prior Publication Data
US 2018/0015812 A1 Jan. 18, 2018

(30) Foreign Application Priority Data
Jul. 12, 2016 (DE) .......................... 10 2016 112 716

(51) Int. Cl.
*B60J 5/04* (2006.01)
*B60J 1/17* (2006.01)
*E05B 79/04* (2014.01)

(52) U.S. Cl.
CPC .............. *B60J 5/0463* (2013.01); *B60J 1/17* (2013.01); *B60J 5/0419* (2013.01); *B60J 5/0468* (2013.01); *B60J 5/0469* (2013.01); *E05B 79/04* (2013.01)

(58) Field of Classification Search
CPC ...... B60J 5/0463; B60J 5/0468; B60J 5/0469; B60J 5/0419; B60J 1/17; E05B 79/04
USPC .......................................... 49/503, 502, 349
See application file for complete search history.

(56) References Cited

U.S. PATENT DOCUMENTS

| | | | | |
|---|---|---|---|---|
| 3,703,053 A * | 11/1972 | De Rees | .................... | B60J 1/17 49/375 |
| 4,471,251 A * | 9/1984 | Yamashita | ............. | B60J 5/0405 296/146.2 |
| 4,575,138 A * | 3/1986 | Nakamura | ............ | E05B 77/265 292/216 |
| 4,829,713 A * | 5/1989 | Bozyk | .................... | B60J 5/0416 49/503 |
| 4,831,710 A * | 5/1989 | Katoh | .................... | B60J 5/0406 29/430 |
| 4,974,365 A * | 12/1990 | Ono | .......................... | B60J 1/14 49/348 |

(Continued)

FOREIGN PATENT DOCUMENTS

SE    101 44 330    4/2003

OTHER PUBLICATIONS

German Search Report dated Jul. 12, 2012.

*Primary Examiner* — Jerry E Redman
(74) *Attorney, Agent, or Firm* — Gerald E. Hespos; Michael J. Porco; Matthew T. Hespos

(57) ABSTRACT

A vehicle component (1) has a component part (2) for arranging on a vehicle door (10) of a motor vehicle (100). An alignment system (3) with an alignment element (4) and with a fixed point structure (5) is arranged on the vehicle door (10) for aligning the component part (2) in a defined mounting position. The alignment element (4) comprises a first connecting portion (14) for fastening to the fixed point structure (5) and a second connecting portion (24) for fastening the component part (2). Starting from the fixed point structure (5), the component part (2) is thereby positionable in the defined mounting position by the alignment element (4). The fixed point structure (5) is a door lock device (6), and the component part (2) is a paneling component part (7) of the vehicle door (10).

15 Claims, 7 Drawing Sheets

(56) References Cited

U.S. PATENT DOCUMENTS

| | | | | |
|---|---|---|---|---|
| 5,125,698 | A * | 6/1992 | Thau | E05B 85/045 |
| | | | | 292/216 |
| 5,581,952 | A * | 12/1996 | Kapes | B60J 5/0416 |
| | | | | 49/348 |
| 5,752,346 | A * | 5/1998 | Kritzler | B60J 5/0433 |
| | | | | 49/502 |
| 5,902,004 | A * | 5/1999 | Waltz | B60J 5/0416 |
| | | | | 296/146.9 |
| 5,924,245 | A * | 7/1999 | Manuel | B60J 5/0416 |
| | | | | 49/352 |
| 6,330,764 | B1 * | 12/2001 | Klosterman | B60J 1/17 |
| | | | | 49/375 |
| 6,393,767 | B1 * | 5/2002 | Fukumoto | B60J 5/0402 |
| | | | | 49/503 |
| 6,536,832 | B1 * | 3/2003 | Grimm | B60J 5/0416 |
| | | | | 296/146.5 |
| 7,111,893 | B2 * | 9/2006 | Carter | B60J 5/0416 |
| | | | | 292/DIG. 23 |
| 7,784,220 | B2 * | 8/2010 | Wild | B60J 5/0416 |
| | | | | 49/503 |
| 9,382,732 | B2 * | 7/2016 | Arabia, Jr. | E05B 77/44 |
| 9,598,026 | B2 * | 3/2017 | Lee | B60R 13/0206 |
| 2008/0252097 | A1 * | 10/2008 | Miyamoto | B60J 1/17 |
| | | | | 296/146.2 |
| 2008/0276541 | A1 * | 11/2008 | Roy | B60J 5/0416 |
| | | | | 49/502 |
| 2010/0107501 | A1 * | 5/2010 | Iimori | E05F 11/423 |
| | | | | 49/349 |
| 2011/0258935 | A1 * | 10/2011 | Heller | B60J 5/0451 |
| | | | | 49/502 |
| 2016/0290006 | A1 * | 10/2016 | Keller | B60J 5/0416 |
| 2018/0154743 | A1 * | 6/2018 | Rao | B60J 5/0412 |

* cited by examiner

A-A

VEHICLE COMPONENT

CROSS REFERENCE TO RELATED APPLICATION

This application claims priority under 35 USC 119 to German Patent Appl. No. 10 2016 112 716.7 filed on Jul. 12, 2016, the entire disclosure of which is incorporated herein by reference.

BACKGROUND

1. Field of the Invention

The invention relates to a vehicle component with at least one component part for arranging on at least one vehicle door of a motor vehicle.

2. Description of the Related Art

Components, such as paneling and window panes, that are installed on vehicle doors during the manufacturing of a motor vehicle must be aligned properly. For this purpose, the mounting position of the component generally has to be adjusted in relation to other windows or adjacent body parts. Precise alignment of these parts is an essential feature of high quality vehicles.

A precisely adjusted mounting position of paneling component parts and door window panes is of great importance for the overall visual impression of the vehicle, for aerodynamic performance and for minimizing wind noise. However, careful alignment of the component parts very frequently is associated with a high expenditure of time.

It is an object of the subject invention to simplify the installation and alignment of at least one component part of a vehicle door during the manufacturing of motor vehicles.

SUMMARY

The vehicle component according to the invention comprises at least one component part for arranging on at least one vehicle door of a motor vehicle. The component part comprises at least one alignment system. The alignment system comprises at least one alignment element and at least one fixed point structure that is arranged on the vehicle door for aligning the component part in a defined mounting position. The alignment element comprises at least one first connecting portion for fastening to the fixed point structure and at least one second connecting portion for fastening the component part. The alignment element and the fixed point structure enable the component part to be positioned in the defined mounting position. The fixed point structure may be a door lock device. The component part may comprise at least one paneling component part for the vehicle door.

The vehicle component of the invention has many advantages, and the alignment system with the at least one alignment element affords a considerable advantage. A fixed point structure can be used to align the component part in a desired mounting position even as the component part is being fastened. The alignment element permits a reliable and uncomplicated connection of the component part to the fixed point structure without a time-costly alignment. As a result, the installation of a vehicle door is simplified considerably and can be carried out in a significantly shorter time.

The door lock device generally is adjusted precisely on the vehicle door and advantageously can be the fixed point structure. Additionally, a paneling component part advantageously can be the component part also because such paneling component parts must be aligned very precisely in their mounting position so as not to disturb the visual appearance and the aerodynamics of the vehicle.

The alignment element may be fastenable in a self-centering manner to the door lock device, and the paneling component part may be fastenable in a self-centering manner to the alignment element. A self-centering fastening enables the alignment element or the paneling component part to be fit initially and automatically with precise alignment. The alignment system is particularly suitable to permit a permanent fastening of the component part only in the defined mounting position.

For this purpose, at least one guide element and/or at least one latching device may be provided and may permit a self-centering fastening. The guide element can be conical. The corresponding components can be arranged initially with play relative to each other. This play becomes ever smaller by bringing the components together, until a precisely fitting alignment is reached. The latching device then preferably latches into place in this alignment.

The door lock device may comprise at least one guide element that is connectable in an at least partially form-fitting manner to or in the alignment element. For example, the guide element may be a projection on the door lock device. The guide element and the alignment element may connect in a self-centering manner to achieve a precisely aligned fastening of the alignment element to the door lock device.

The alignment element may comprise at least one latching device for latching to the door lock device. As a result, the alignment element can be fastened to the door lock device rapidly and without tools and with a stable latching connection. The latching device may latch the alignment element in a self-centering manner to the door lock device.

The latching device may comprise at least one flexible latching element that may be arranged on the alignment element. However, the flexible latching element may be arranged on the door lock device. The flexible latching element may engage in at least one undercut by means of at least one latching hook. The latching connection may not be releasable without a specific movement of the latching element. The latching device may comprise at least two flexible latching elements. Latching of the latching element in the undercut may be permitted only in a precisely fitting alignment of the alignment element in relation to the door lock device.

The alignment element may be a unitary shaped part, such as an injection molded part and may be formed from a plastics material. This permits cost-effective production and adaptation of the alignment element to the respective connecting contours of the component part or of the fixed point structure. The alignment element also may be manufactured from another suitable material and may comprise plural parts.

The paneling component part and the second connecting portion may be connectable by at least one latching device that connects the paneling component part in a self-centering manner to the second connecting portion of the alignment element. The latching device may be the previously described latching device between the door lock device and alignment element. The flexible latching element may be on the alignment element and particularly on the second connecting portion. The flexible latching element may be arranged on the paneling component part. As a result, the paneling component part can be fastened reliably and aligned in a precisely fitting manner on the second connecting portion.

The latching device may be configured to latch on the second connecting portion by displacement of the paneling component part in the Z direction or in the direction of the vertical axis of the vehicle. The paneling component part can thereby be inserted in a particularly simple manner from above into the vehicle door and latched.

The paneling component part may be arranged at least partially on an outer side of the vehicle door and may cover a region of the outer side of the vehicle door. In particular, the paneling component part may be arranged on the vehicle door in the region of the B pillar. Such a paneling component part is suitable for use with the alignment system since an exact alignment on the outer side of the vehicle door is particularly crucial for avoiding wind noises.

The paneling component part may comprise at least one fastening portion that is configured to connect to the second connecting portion. The fastening portion may extend at least partially into the vehicle door. In particular, the fastening portion may extend as far as the door lock device or the alignment element arranged thereon. The fastening portion may be elongated to permit a good connection of regions of the paneling component part that are located on the outside. In particular, the fastening portion and the paneling component part may be a single part. The fastening portion may be in the vehicle door so as not to be visible from the outside.

The fastening portion may comprise at least one stop. The stop is placeable on the alignment element in a defined mounting position, preferably in the Z direction. The stop simplifies the pushing-in and may be configured so that the latching device latches as soon as the stop lies against the alignment element. Thus, a fixed connection is provided during the pushing-in operation. The fastening portion also may lie against the alignment element at least in sections in the X direction (the direction of the longitudinal axis of the) and/or in the Y direction (the direction of the transverse axis of the vehicle).

The paneling component part may be fixable in the defined mounting position by at least one fastening means, such as by at least one screw connection. In particular, the paneling component part is fixed when it has been brought into the required mounting position by the alignment system. Such a fixing ensures that the paneling component part remains permanently in the defined mounting position. The paneling component part also may be bonded adhesively in the defined mounting position.

The paneling component part may be a single part that can be formed from plastic or metal. The paneling component part can also be of multi-part design.

The vehicle component also may comprise at least one further component part, such as at least one openable door window pane. The door window pane may be positionable by the alignment system.

The vehicle component also may comprise at least one further fixed point structure, such as at least one fixed window device. The window device may be a triangular window that need not be openable. The alignment element may position the door window pane in a defined mounting position starting from the window device. The alignment system may position the door window pane in a self-centering manner on the alignment element and/or to position the alignment element in a self-centering manner on the window device. Such a configuration is particularly advantageous since the installation of an openable door window pane in a vehicle door frequently requires complicated adjustment. However, the alignment system enables the door window pane to be adjusted in a rapid and uncomplicated manner via the fixed window device as the fixed point structure. A window device is particularly suitable as a fixed point structure since the window device is aligned reliably to avoid wind noises.

The alignment element may be an elongate guide profile or may comprise at least one such guide profile. The door window pane may be insertable into the guide profile, and the guide profile may be fastened by an end region to the window device. For example, the window device may comprise at least one window pane and at least one frame component part for receiving the window pane. This guide profile may be fastened to the frame component part. In particular, the guide profile at least partially engages around the door window pane. In particular, the door window pane may be movable in the Z direction in the guide profile. Such an elongate guide profile permits a particularly reliable alignment of the openable door window pane.

It is possible for the further fixed point structure may comprise at least one window lifter device for the door window pane. As a result, the door window pane is alignable both via the window device and the window lifter device as fixed point structure.

At least one further alignment element may be provided for the connection of the door window pane to a window lifter device as the fixed point structure. The alignment element also may be at least one driver of the door lifter device and at least one driver connection of the door window pane. Thus, the door window pane can be arranged on the window lifter device and can be aligned simply and reliably. The driver may be movable in the Z direction to transport the door window pane between open and closed positions.

The further alignment element may comprise at least one latching device. In particular, at least one undercut may be arranged on the door window pane and may be engaged by at least one flexible latching element that engages by a latching hook. The latching element may be on the window lifter device, such as on a driver. In particular, the latching element may be movable on the window lifter device.

The invention also relates to a vehicle component with at least one component part for arranging on at least one door of a motor vehicle and with at least one alignment system having at least one alignment element and with at least one fixed point structure on the vehicle door for aligning the component part in a defined mounting position. The alignment element may comprise at least one first connecting portion for fastening to the fixed point structure and at least one second connecting portion for fastening the component part. Thus, starting from the fixed point structure, the alignment element positions the component part in the defined mounting position. The fixed point structure may be a fixed window device and/or window lifter device, and the component part may comprise at least one openable door window pane of the vehicle door.

The invention also relates to a motor vehicle with a vehicle component as previously described.

Further advantages and features of the invention emerge from the exemplary embodiments that are explained below with reference to the attached figures.

DETAILED DESCRIPTION

Figure 1:
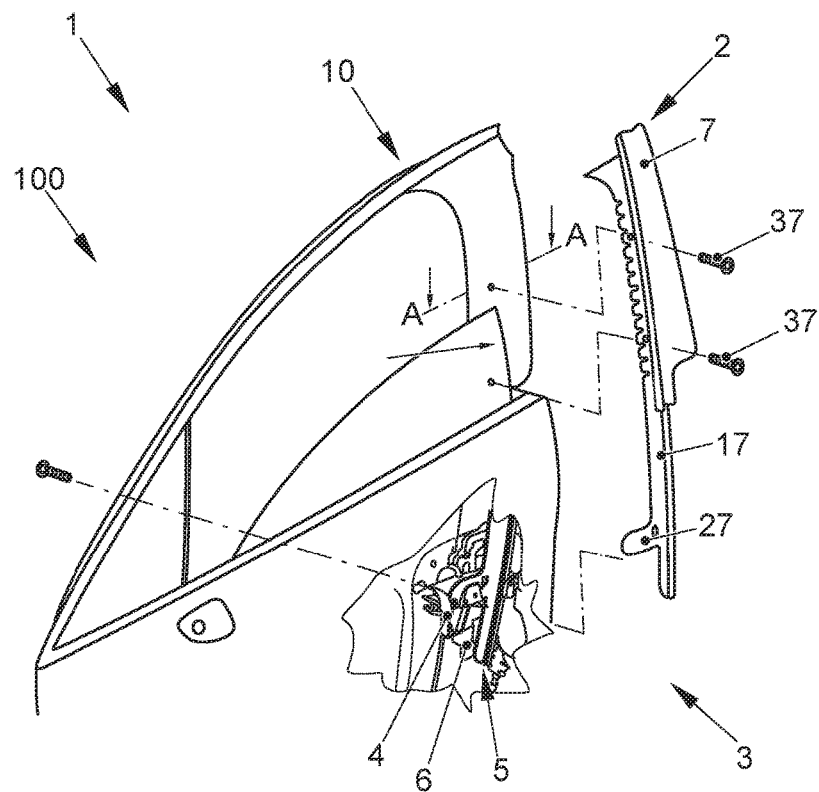
FIG. 1 shows a schematic illustration of a vehicle door with a vehicle component according to the invention in an exploded view.

FIG. 1 shows sections of a motor vehicle 100 with a vehicle component 1 according to the invention. The vehicle component 1 comprises a component part 2 that is a paneling component part 7 defining a panel for the outer region of a front vehicle door 10. The paneling component part 7 is fastened to the vehicle door 10 in a defined mounting position to provide uniform gap sizes and reduced wind noises.

The outer skin of the vehicle door 10 is illustrated partially transparently so that the components in the interior of the vehicle door 10 become visible.

An alignment system 3 is provided to permit rapid installation. The paneling component part 7 can thereby be fastened in a self-centering manner in the desired mounting position to avoid a subsequent alignment or adjustment. Adjustment possibilities can be dispensed with to achieve further costs savings.

The alignment system 3 comprises an alignment element 4 and a fixed point structure 5 that comprises a door lock device 6. The door lock device 6 to which the alignment element 4 is fastened with a first connecting portion 14 in the interior of the vehicle door 10. The alignment element 4 is a unitary injection molded part that permits cost-effective production and optimum adaptation to the contours of the fixed point structure 5.

Figure 2:
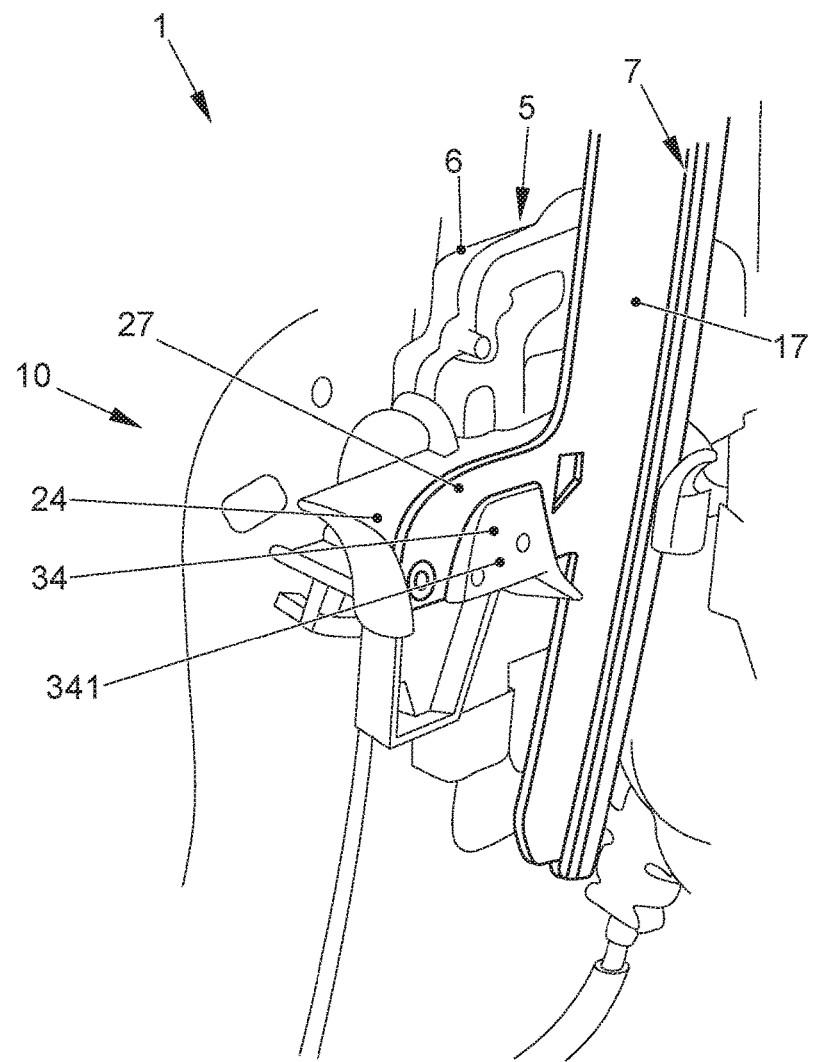
FIG. 2 is an illustration of details from FIG. 1.
Figure 3:
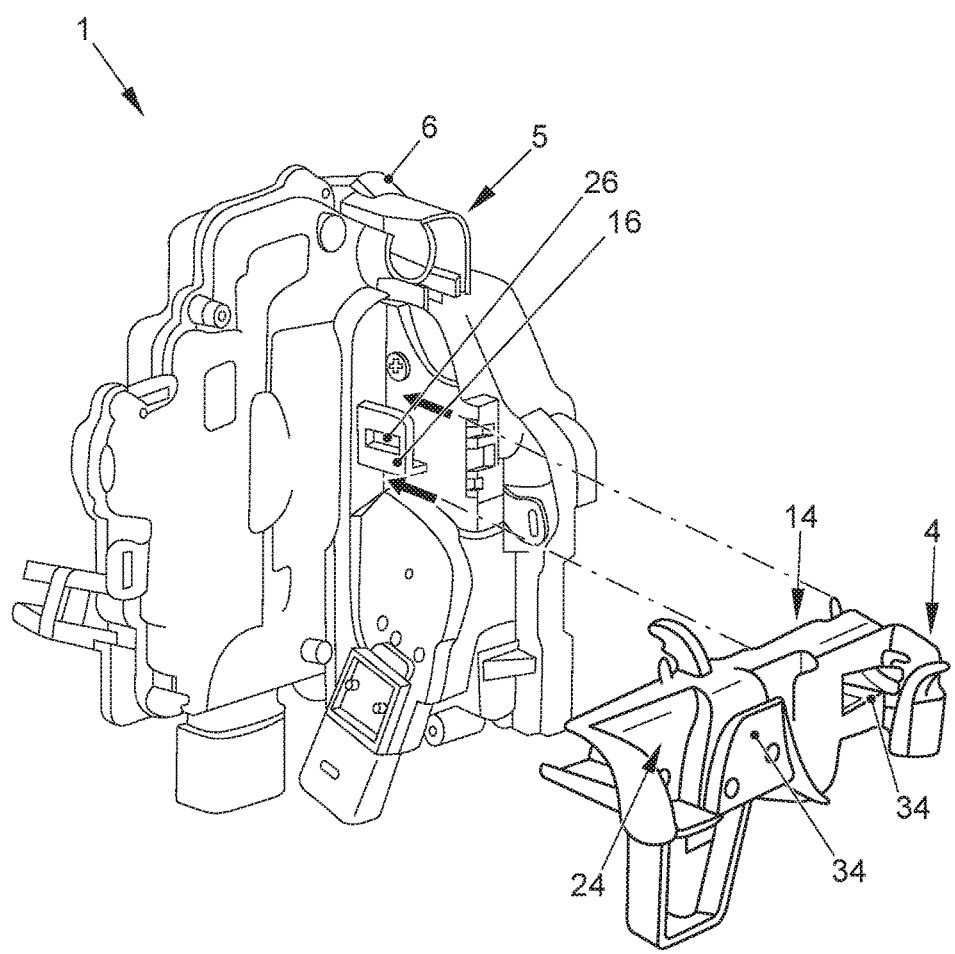
FIG. 3 is an exploded schematic illustration of a door lock device with an alignment element.
Figure 4:
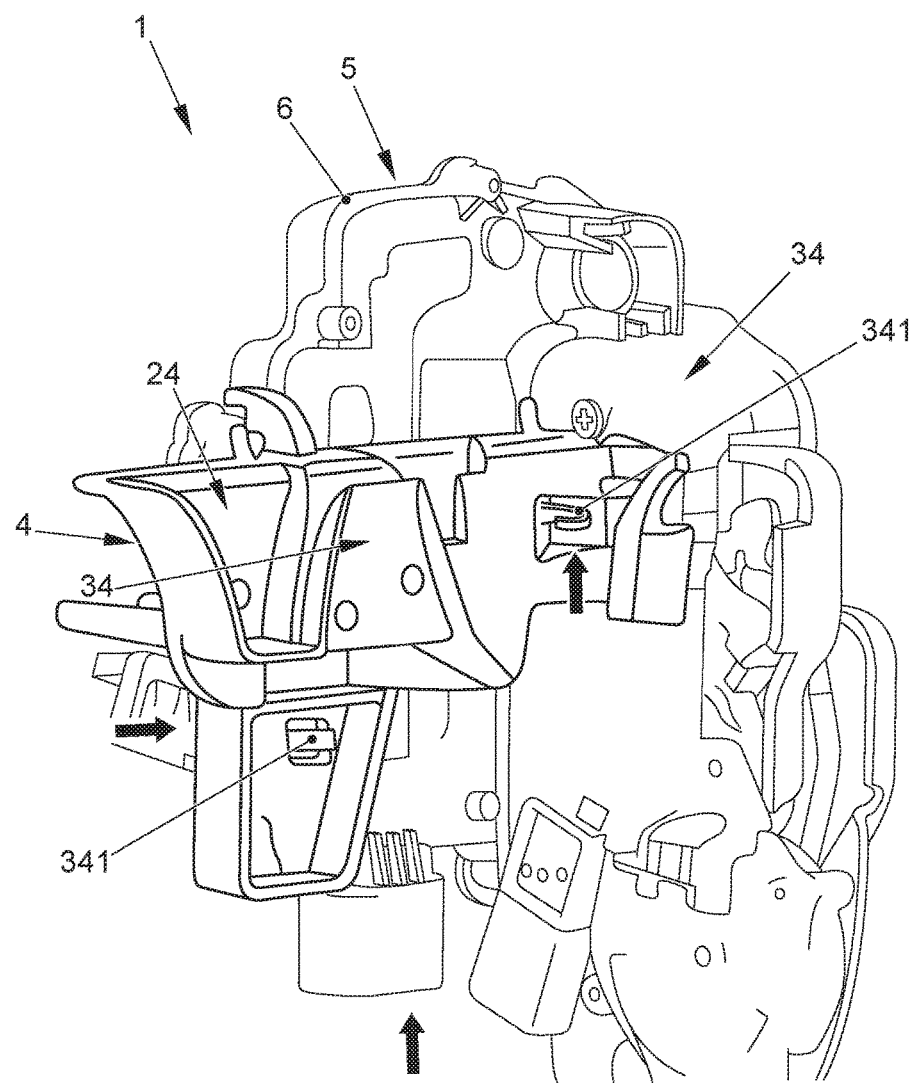
FIG. 4 shows the door lock device and the alignment element of FIG. 3 in another arrangement.

The alignment system 3 is described in more detail with respect to FIGS. 1-4. FIG. 2 is an enlarged illustration of the components that can be seen in FIG. 1 through the transparently illustrated outer skin. FIG. 3 shows the door lock device 6 with the alignment element 4 in an exploded illustration. FIG. 4 shows the door lock device 6 with the alignment element 4 fastened thereto.

The door lock device 6 is aligned during installation to achieve a defined mounting position. The door lock device 6 therefore defines a fixed point structure 5 that enables the paneling component part 7 to be brought into a defined mounting position via the alignment element 4. The door lock device 6 is fixed with at least one fastening means, such as a screw connection.

The alignment element 4 is fastened to the door lock device 6 by a first connecting portion 14 after the alignment of the door lock device 6. The direction of movement of the alignment element 4 during installation on the door lock device 6 is sketched by chain-dotted lines in FIG. 3.

The door lock device 6 has a guide element 16 to permit a self-adjusting connection of the alignment element 4. The guide element 16 engages in a form-fitting manner in a corresponding recess in the alignment element 4. A latching device 34 latches and permanently fixes the alignment element 4 that is in a precise fitting position with respect to the door lock device 6. FIG. 4 shows the alignment element 4 in a latched state.

The latching device 34 comprises two flexible latching elements 341 and each has a latching hook. The latching hooks engage in a corresponding undercut 26 in the guide element 16 of the door lock device 6 only when the alignment element 4 is in the required position with respect to the door lock device 6 to achieve a self-centering fastening. As a result, the alignment element 4 also assumes an adjusted position.

The paneling component part 7 comprises an elongate fastening portion 17 that extends into the interior of the vehicle door 10 to the fixed point structure 5 with the alignment element 4. A stop 27 is arranged on the fastening portion 17 and can be fastened to a second connecting portion 24 of the alignment element 4.

The connection of the paneling component part 7 to the alignment element 4 likewise takes place a self-centering manner. For this purpose, a latching device 34 is provided in the second connecting portion 24 and can be latched to the stop 27 when the paneling component part 7 lies in a precise fitting manner. For this purpose, the alignment element 4 on the second connecting portion 24 has at least one flexible latching element 341 with a latching hook that engages into an undercut of the stop 27.

The installation of the paneling component part 7 begins with the latching of the alignment element 4 on the door lock device 6. The paneling component part 7 then is introduced with the fastening portion 17 into the vehicle door 10 in the Z direction. The paneling component part 7 is pushed into the vehicle door 10 until the stop 27 lies against the second connecting portion 24 of the alignment element.

The paneling component 7 is now in the designated mounting position or can be brought into the designated mounting position by a slight movement. If the paneling component part 7 is aligned suitably, the latching element 341 of the latching device 34 grips into the undercut in the stop 27 so that the paneling component part 7 is fixed in the defined mounting position.

The paneling component part 7 can also be screwed to the vehicle door 10 with fastening means 37 for the permanent fixing.

The alignment system 3 of the vehicle component 1 also can be used for fixing other component parts 2 in a defined mounting position. The alignment system also can have fixed point structures 5 other than the door lock device 6. The connecting portions 14, 24 of the alignment element 4 then are adapted to the connecting contours of the respective component part 2 or of the respective fixed point structure 5.

A further vehicle component 1 is shown in FIGS. 5-8. The vehicle component 1 comprises a further component part 12 that is an openable door window pane 9. In addition, the vehicle component 1 has a fixed window device 8 and a window lifter device 25 as fixed point structures 15. An alignment element 4 is provided for fastening the door window pane 9 to the window device 8 and to the window lifter device 25.

Figure 5:
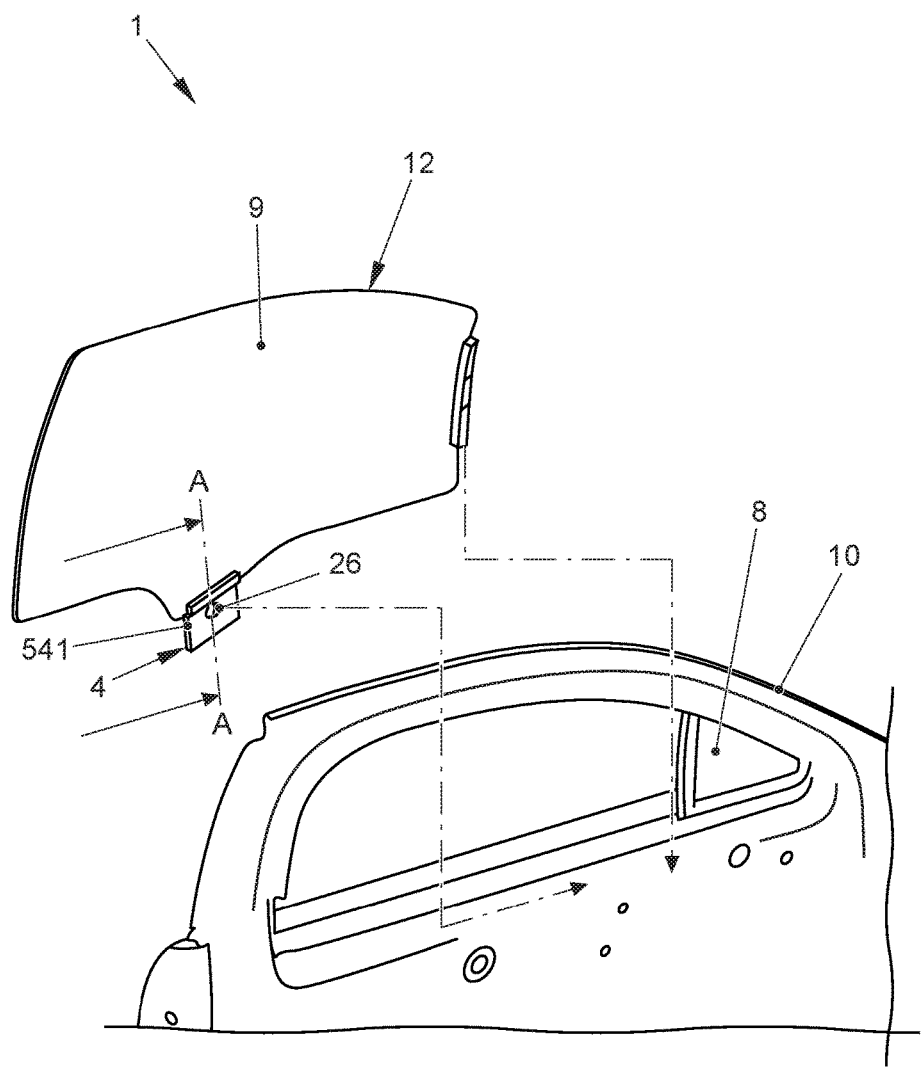
FIG. 5 is an exploded schematic illustration of a vehicle door with a vehicle component.
Figure 6:
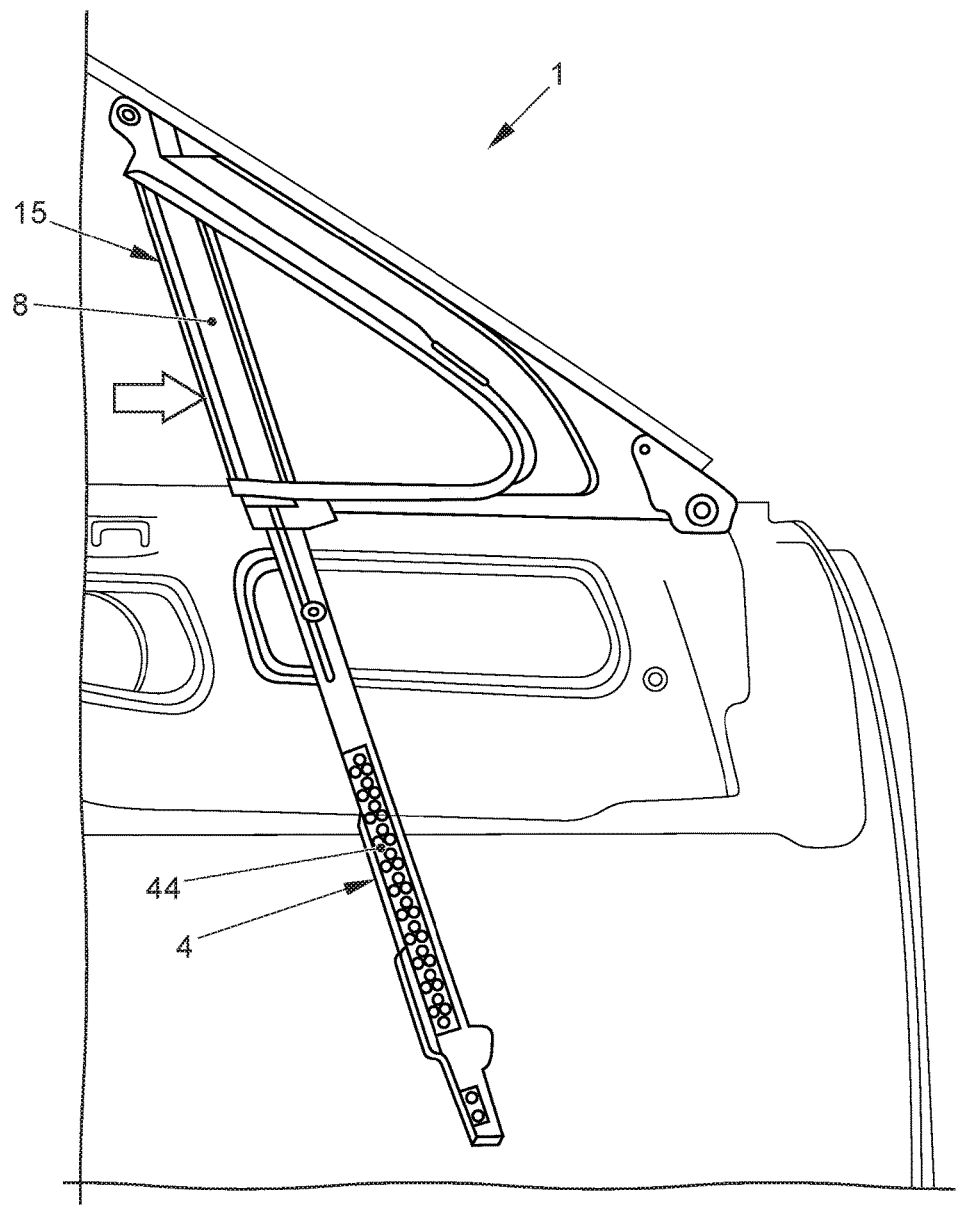
FIG. 6 shows a schematic illustration of the vehicle component of FIG. 5 in a view of an inner side of the vehicle door.
Figure 7:
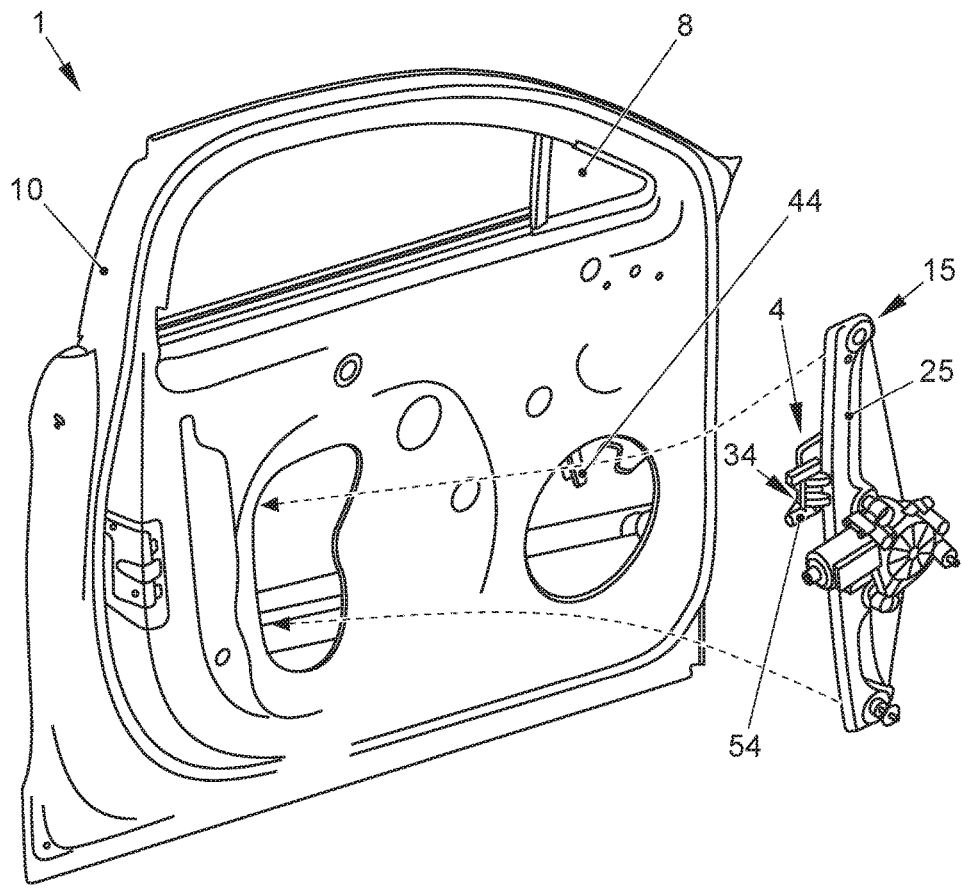
FIG. 7 shows a perspective illustration of the vehicle component in a perspective view of the inner side of the vehicle door.
Figure 8:
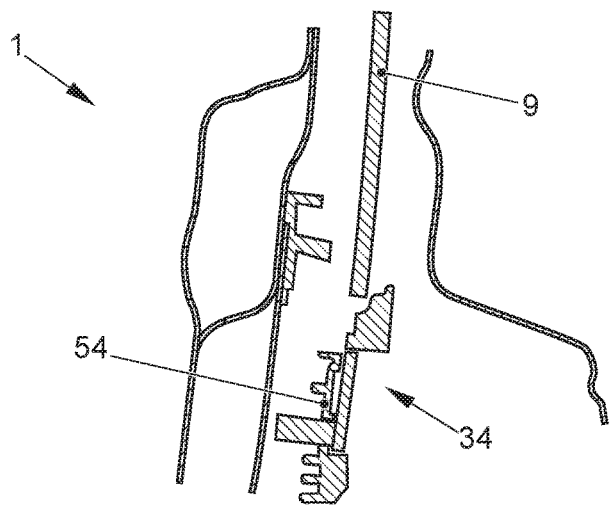
FIG. 8 is a cross-sectional view taken along the line A-A of FIG. 6.

FIG. 5 shows the vehicle door 10 with the door window pane 9 to be fitted. In FIG. 6, the window device 8 is the fixed point structure 15 and is shown in the fitted state. FIG. 7 shows the window lifter device 25 as the fixed point structure 15 and is fit in the interior of the vehicle door 10. FIG. 8 is a cross-section taken along line A-A in FIG. 5 and shows the alignment system 3. The door window pane 9 of this embodiment is latched to the window lifter device 25 via a latching device 34.

The alignment element 4 for the window device 8 is a guide profile 44. In the designated mounting position of the window device 8, the guide profile 44 extends into the interior of the vehicle door 10. The guide profile is designed so that the door window pane 9 is displaceable within the guide profile 44 in the longitudinal direction thereof.

The alignment element 4 for the window lifter device 25 is a movable driver 54 that comprises a latching device 34 to fasten the door window pane 9 to the driver 54.

The alignment element for connecting the door window pane 9 to the window lifter device 25 also has a driver connection 541 fastened to the door window pane 9. The driver connection 541 has an undercut in which a flexible latching element of the driver 54 engages as soon as the components are aligned in a precise fitting manner with respect to one another.

The installation of the door window pane 9 begins by arranging the window device 8. The window device 8 is inserted with the guide profile 44 into the vehicle door 10 and brought into the desired mounting position. The window lifter device 25 subsequently is fit to the vehicle door 10 and aligned.

The door window pane 9 now is introduced into the vehicle door 10 and inserted into the guide profile 44 of the window device 8. In addition, the driver connection 541 fastened to the door window pane 9 is connected to the driver 54 via the latching device 34. The door window pane 9 now is fixed in a defined mounting position via two fixed point structures 15, namely the window device 8 and the window lifter device 25.

LIST OF REFERENCE NUMBERS

1 Vehicle component
2 Component part
3 Alignment system
4 Alignment element
5 Fixed point structure
6 Door lock device
7 Paneling component part
8 Window device
9 Door window pane
10 Vehicle door
12 Component part
14 Connecting portion
15 Fixed point structure
16 Guide element
17 Fastening portion
24 Connecting portion
25 Window lifter device
26 Undercut
27 Stop
34 Latching device
37 Fastening means
44 Guide profile
54 Driver
100 Motor vehicle
341 Latching element
541 Driver connection

What is claimed is:

1. A vehicle component with at least one paneling component part for arranging on at least one vehicle door of a motor vehicle in a position where a part of the paneling component part is visible from positions external of the vehicle door, the vehicle door including a door lock device defining a fixed point structure in an interior of the vehicle door, the vehicle component comprising: a fastening portion formed on the paneling component part and extending into the interior of the vehicle door; at least one alignment element fastened to the door lock device and disposed in the interior of the vehicle door for aligning the paneling component part in a defined mounting position, the alignment element having at least one first connecting portion for fastening to the door lock device and at least one second connecting portion for fastening the fastening portion of the paneling component part so that the paneling component part is positionable in the defined mounting position by the alignment element.

2. The vehicle component of claim 1, wherein the alignment element is fastenable in a self-centering manner to the door lock device and the paneling component part is fastenable in a self-centering manner to the alignment element.

3. The vehicle component of claim 1, wherein the door lock device comprises at least one guide element that is connectable in a form-fitting manner to the alignment element.

4. The vehicle component of claim 1, wherein the alignment element comprises at least one latching device for latching to the door lock device.

5. The vehicle component of claim 1, wherein the alignment element is a unitary shaped part.

6. The vehicle component of claim 1, wherein the paneling component part and the second connecting portion are connectable by at least one latching device.

7. The vehicle component of claim 1, wherein the paneling component part is at least partially arranged on an outer side of the vehicle door.

8. The vehicle component of claim 1, wherein the paneling component part comprises at least one fastening portion that extends into the vehicle door and that is connectable to the second connecting portion.

9. The vehicle component of claim 8, wherein at least one stop is arranged on the fastening portion and is placeable on the alignment element in a Z direction of the vehicle.

10. The vehicle component of claim 1, wherein the paneling component part is fixable in the defined mounting position by a screw connection.

11. The vehicle component of claim 1, wherein the paneling component part is a single part.

12. The vehicle component of claim 1, comprising at least one further component part with at least one openable door window pane that is positionable by the alignment system, and at least one further fixed point structure that comprises a fixed window device, and is positionable in a defined mounting position by the alignment element.

13. The vehicle component of claim 12, wherein the alignment element is an elongate guide profile into which the door window pane is insertable and that is fastened by an end region to the window device.

14. The vehicle component of claim 13, wherein the further fixed point structure comprises at least one window lifter device for the door window pane, and the door window pane is alignable both via the window device and the window lifter device as the fixed point structure.

15. The vehicle component of claim 14, comprising at least one further alignment element for connecting the door window panel to the window lifter device.

* * * * *